United States Patent [19]
Olivo

[11] Patent Number: 5,285,640
[45] Date of Patent: Feb. 15, 1994

[54] INTEGRATED POST-ENGINE EMISSIONS HEATER, CATALYTIC CONVERTER AND MUFFLER

[76] Inventor: John R. Olivo, 5410 W. Agatite Ave., Chicago, Ill. 60630

[21] Appl. No.: 917,760

[22] Filed: Jul. 21, 1992

[51] Int. Cl.⁵ .................................................. F01N 3/28
[52] U.S. Cl. ........................................ 60/274; 60/300; 60/301; 422/171; 422/174; 423/213.7
[58] Field of Search ........................ 60/300, 301, 274; 422/171, 174; 423/213.7

[56] References Cited

U.S. PATENT DOCUMENTS

| | | | |
|---|---|---|---|
| 2,674,521 | 4/1954 | Houdry | 60/298 |
| 2,880,079 | 3/1959 | Cornelius | 60/298 |
| 3,302,394 | 2/1967 | Pahnke | 60/302 |
| 3,445,195 | 5/1969 | Benteler | 60/298 |
| 3,460,916 | 8/1969 | Aronsohn | 60/299 |
| 3,656,915 | 4/1972 | Tourtellotte | 60/301 |
| 3,710,575 | 1/1973 | Lamm | 60/298 |
| 3,730,691 | 5/1973 | Lang | 60/301 |
| 3,733,181 | 5/1973 | Tourtellotte | 422/174 |
| 3,947,544 | 3/1976 | Yamada | 60/298 |
| 4,060,985 | 12/1977 | Fukushima | 123/41.64 |
| 4,164,847 | 8/1979 | Johansen | 60/298 |
| 5,010,051 | 4/1991 | Rudy | 423/213.7 |
| 5,140,813 | 8/1992 | Whittenberger | 422/174 |

FOREIGN PATENT DOCUMENTS

| | | | |
|---|---|---|---|
| 2333092 | 1/1975 | Fed. Rep. of Germany | 422/174 |
| 411655 | 6/1934 | United Kingdom | 60/302 |

OTHER PUBLICATIONS

"Hot Cat" by David Scott, *Popular Science*, Apr. 1992, pp. 39–40.

Primary Examiner—Douglas Hart
Attorney, Agent, or Firm—Cherskov & Flaynik

[57] ABSTRACT

A method for treating engine emissions and a device for treating engine emissions and dampening engine noise are provided. The invention provides for multiple zones of reaction so as to treat reducible emission components by providing a low oxygen, relatively cool reducing zone and also to treat oxidizable emission components by providing a relatively high oxygen, hotter oxidizing zone. A feature of the invention includes a heating means situated adjacent to or embedded into an oxidizing catalyst or an oxidation zone of a three-way catalyst.

17 Claims, 4 Drawing Sheets

INTEGRATED POST-ENGINE EMISSIONS HEATER, CATALYTIC CONVERTER AND MUFFLER

BACKGROUND OF THE INVENTION

1. Field of the Invention

This invention relates to a post-engine emissions treatment device, and specifically to an integrated muffler and catalytic converter designed to heat and catalytically treat engine emissions.

2. Background of the Invention

The contribution of engine emissions to environmental pollution is undeniable. A myriad of chemical compounds are produced as a result of the combustion process, the reactions of which are depicted in unbalanced Equations I (excess air) and II (excess fuel) below:

$$(HC)_X + (O_2 + 3.76\, N_2)_Y \rightleftharpoons \underset{\text{major}}{CO_2 + H_2O + N_2 + O_2 +} \quad \text{EQ. I}$$

$$\underset{\text{traces}}{CO + H_2 + (HC)_Z}$$

$$N_2 + O_2 \rightleftharpoons NO$$

$$(HC)_X + (O_2 + 3.76\, N_2)_Y \rightleftharpoons CO_2 + H_2O + CO + H_2 + \quad \text{EQ. II}$$

$$\underset{\text{trace}}{N_2 + (HC)_Z + O_2}$$

$$N_2 + O_2 \rightleftharpoons NO$$

wherein $(HC)_x$ represents fuel and $(O_2+3.76\, N_2)$ represents the relative stoichiometric amounts of oxygen and nitrogen in air.

The three major targets of emissions clean up are hydrocarbons (HC), carbon monoxide (CO) and, more recently, nitrous oxides ($NO_x$). Excess HC and CO in emission streams result from incomplete combustion, or too little air in the reaction zone. Some exhaust designs, among them the one disclosed in U.S. Pat. No. 1,824,078, have attempted to facilitate combustion of effluent constituents by providing additional air and heat to a reaction zone. However, excess air, combined with the higher operating temperatures associated with today's smaller engines, causes the formation of nitrous oxides.

In theory, the oxidation of any carbon monoxide and hydrocarbons that manage to elude the engine's combustion chamber should be comparatively simple with the addition of air to the still hot exhaust stream; but efforts to provide additional air have resulted in an adverse reduction of temperature at the reaction zone. Furthermore, while notable decreases in hydrocarbon and carbon monoxide concentrations in exhaust gases occur when effluent temperatures exceed 800° C., exhaust gas temperatures rarely reach that level. Instead, the exhaust manifold attains temperatures of only 325 to 750° C. during urban cycle driving speeds of between 0 and 56 miles per hour (90 kilometers per hour). Obviously, these temperatures are lower when the exhaust reaches the catalyst/muffler downstream, and lower still when ambient temperatures are low.

Catalysts are used in low temperature exhaust streams to facilitate the combustion reactions depicted in Equations I and II, supra. There are generally two types of catalysts: reduction catalysts, which break down nitrous oxides into their component nitrogen and oxygen molecules, and oxidative catalysts, which are used to oxidize HCs and CO to $H_2O$ and $CO_2$, respectively.

Many oxidative catalyst configurations require a lean fuel-exhaust mixture in combination with either an air pump to facilitate complete burning, or an aspirator preceding the catalyst to siphon off any residual, unburned fuel to an activated carbon trap. Without such air pumps or aspirators, HC and CO conversion efficiencies peak at only 65 and 45 percent, respectively, after use in a car that has been driven approximately 50,000 miles. Air pump and aspirator usage increases these HC and CO conversion efficiencies to 80 and 75 percent, respectively.

As noted above, an increase in combustion air for more complete burning of HCs and CO increases the likelihood for $NO_x$ formation, as $NO_x$ formation is the direct result of the following oxidation reaction:

$$N_2 + O_2 = 2NO_x$$

To address the clean-up of all three emission constituents, three-way catalysts are typically employed to first reduce the nitrous oxides and then oxidize the HCs and the CO. An inherent requirement in this type of configuration is a low oxygen environment immediately prior to treatment with a reducing catalyst, and a high oxygen, high temperature environment further downstream to facilitate CO and HC oxidation with an oxidation catalyst. To effect this reaction sequence, a three-way catalyst is first employed for initial clean up of exhaust, and then another catalyst, downstream from the three-way catalyst, provides additional treatment. In these configurations, air pumps are necessary to facilitate oxidation reactions.

Another drawback to current designs is their primary reliance only on heat from the exhaust to initiate the catalytic process. As automobiles typically do not attain the minimum 250° C. necessary for catalysts to begin their reduction and oxidation (redox) functions for several minutes after ignition, and considerably longer when ambient temperatures are low, high levels of untreated exhaust constituents are liberated. This problem has prompted the passage of the Clean Air Act Amendments of 1990, 42 U.S.C. Sect 7521 (j), which stipulate more stringent emission controls of CO at 20° F. by 1994.

A need exists in the art for an economical, post-engine emissions clean up device for a myriad of applications, including but not limited to mobile and stationary engines powered by gasoline, ethanol, diesel fuel, LP gas, compressed natural gas, or combinations thereof. This device would also serve to attenuate exhaust noise to a level below legally acceptable noise levels. The integrated device would contain redox chambers by providing a low oxygen reaction zone or stage for $NO_x$ reduction and a high oxygen reaction zone or stage for HC and CO oxidation. Also contained in the integrated process would be a preheater to initiate the catalytic process during the first few, critical minutes after initiation of combustion. To minimize cost and maintenance, the design of the device would allow for easy replacement of catalysts and would not require an air pump.

OBJECTS OF THE INVENTION

It is an object of the present invention to provide an economical, post-engine emissions clean up device for a myriad of applications, including but not limited to mobile and stationary engines powered by gasoline, ethanol, diesel fuel, LP gas, compressed natural gas, or combinations thereof, to overcome many of the disadvantages of the devices of the prior art.

Another object of the present invention is to provide a muffler system that minimizes engine emissions. A feature of the present invention is the heating up of emissions after catalytic reduction and before or during catalytic oxidation of the pollutants in the emissions stream. An advantage of the invention is the conversion of harmful emission constituents to relatively harmless $N_2$, $CO_2$, and $H_2O$.

Still another object of the present invention is to provide a muffler system that aids in a more complete reduction of $NO_x$, and oxidation of CO, and HC emissions. A feature of the invention is to provide a multipurpose shroud which surrounds the outer surface of the combustion chamber of the muffler. An advantage of the shroud design is multifold and includes i) providing an insulating effect against very cold ambient air, ii) drawing off excess heat from an upstream portion of the reaction chamber, so as to avoid endothermic reactions leading to production of $NO_x$, iii) directing the heat to a downstream portion of the reaction chamber so as to maintain higher temperatures within the reaction chamber to facilitate the exothermic HC and CO oxidation reactions, and iv) preventing unburned HC and CO emissions from leaking out of the device prior to oxidation by having in-rushing air mixing with said emissions, thereby taking the place of expensive air pumps Yet another object of the present invention is to virtually completely oxidize HCs and CO in an automobile exhaust emissions stream. A feature of the invention is to aerate the oxidizing reaction zone of the device. An advantage of this arrangement is a more complete combustion of HCs and CO in the emission stream, without the use of air pumps, and without a concomitant increase in $NO_x$ formation.

BRIEF SUMMARY OF THE INVENTION

Briefly, the above and other objects of the present invention are provided by a dual-purpose, sound attenuating- and a post-engine emissions treatment-device and a method to treat engine emissions while attenuating noise.

In accordance with the present invention, a method of reducing engine emissions involves first passing engine exhaust emissions in contact with a reducing catalyst, then maintaining the emissions at a temperature between 200° C. and 400° C., and subsequently passing the engine exhaust emissions in contact with an oxidizing catalyst.

A new and improved post-engine emissions treatment device in accordance with the present invention comprises a reducing catalyst means for reducing oxides found in engine exhaust emissions, a means for heating the treated engine emissions and an oxidizing catalyst means for additionally treating the now heated, treated engine emissions.

BRIEF DESCRIPTION OF THE DRAWING

These and other objects and advantages of the present invention will become readily apparent upon consideration of the following detailed description and attached drawings, wherein.

DETAILED DESCRIPTION OF THE PREFERRED EMBODIMENT

Treatment Method

Generally, a preferred method for treating engine emissions in accordance with the present invention includes the steps of first subjecting a gaseous emissions stream to a reducing environment for reducing $NO_x$ to $N_2$ and $O_2$ and then passing the emission stream through a heated oxygen-rich environment for oxidizing any HC's and CO in the gas stream to water and carbon dioxide.

An alternative emission treatment method comprises the provision for a heated emission stream to be partially treated and then combined with heated, outside air to undergo further reaction.

An emission stream flows into contact with a first catalyst, or alternatively with a first portion of a three way catalyst, that promotes the reduction of emission stream constituents, such as $NO_x$, in an air-deficient environment. The gaseous emission stream is then passed in contact with a second catalyst, or alternatively with a second portion of the three-way catalyst, in combination with heated ambient, outside air for oxidation of HCs and CO to $H_2O$ and $CO_2$. Ambient, outside air is heated by passing in contact with a hot surface before mixing with the exhaust stream in contact with the second catalyst.

Figure 1:
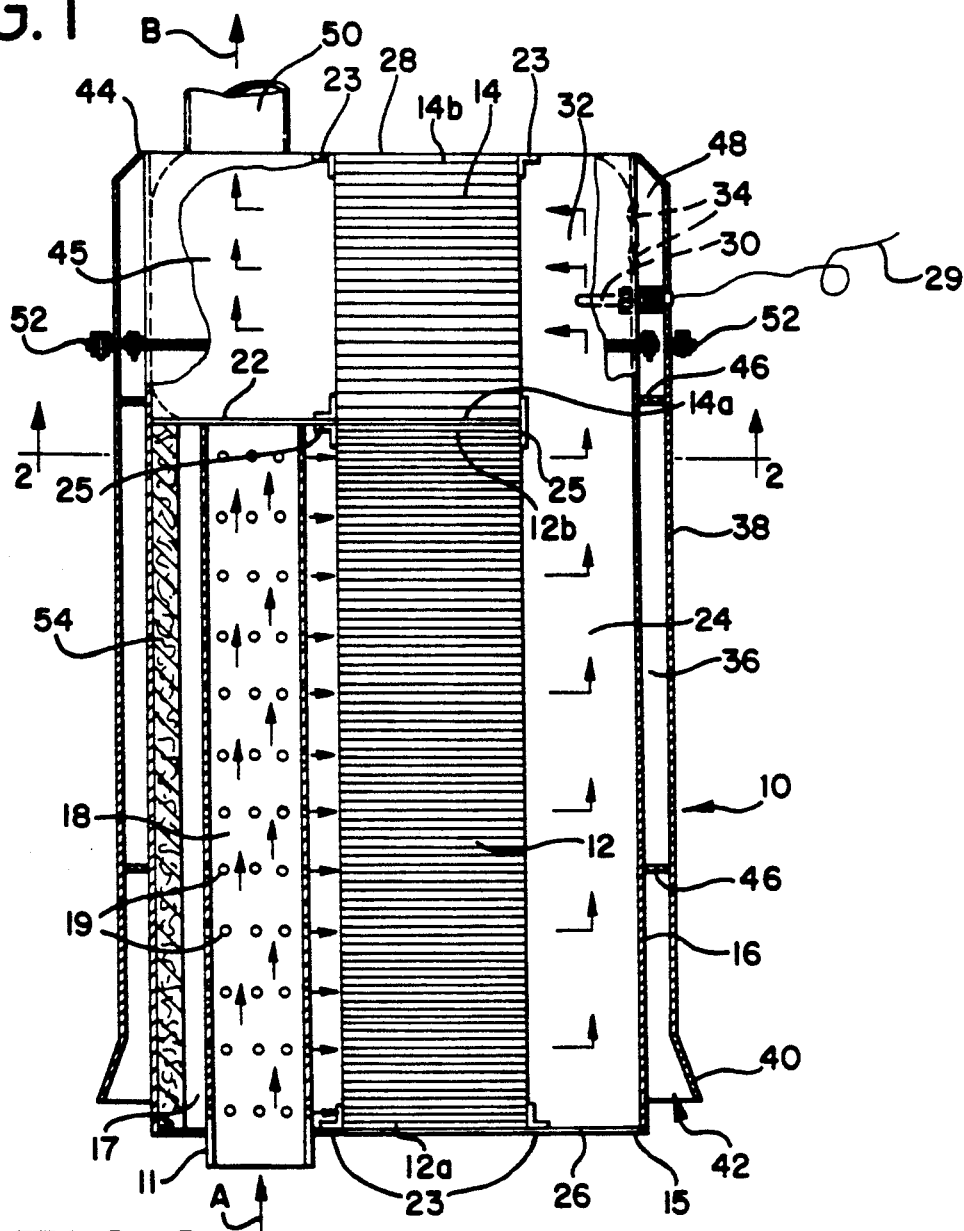
FIG. 1 is a cross sectional view of a new and improved emissions treatment device in accordance with the features of the present invention.

As depicted in FIG. 1, an emission treatment device 10 has an inlet 11 adapted to be connected to a source of exhaust emissions (entering as shown by arrow A) from an engine (not shown), and has an outlet 50 adapted to be connected to an exhaust pipe (not shown), as depicted by arrow B. The emission device 10 includes a hollow body 15 divided into a sound attenuation chamber 17, a chamber for containing a reduction catalyst 12, an exhaust transfer chamber 24, a heating chamber 32, a chamber for containing an oxidation catalyst 14, and an exhaust outlet chamber 45.

Treatment Device

Figure 2:
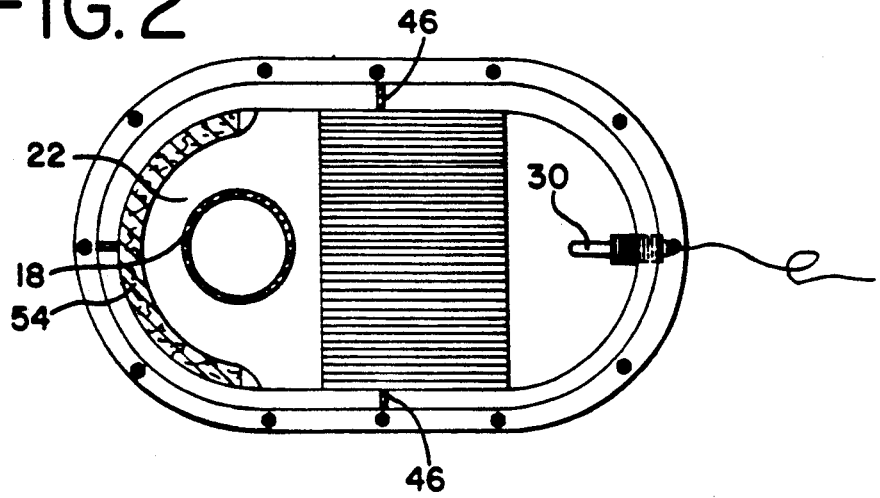
FIG. 2 is a cross-sectional view of the invention taken along line 2—2 of FIG. 1.

Referring to FIGS. 1 and 2, there is shown a new and improved exhaust emissions treatment device for removing pollutants from engine exhaust emissions, and is generally designated by the reference numeral 10.

The emissions treatment device 10 is adapted to handle exhaust emissions received from an internal combustion engine (not shown) by passing the same into contact with the reduction catalyst 12 and subsequently into contact with an oxidation catalyst 14. The device 10 includes an elongated tubular body 15, a tubular side wall 16, an inlet end wall 26, and an outlet end wall 28.

The interior of the elongated tubular body 15 is divided to provide the sound attenuation chamber 17, in which noises generated in the engine and the exhaust manifold thereof are dampened and muffled. The sound attenuation chamber 17 contains a mass of sound attenuating material 54, such as fiberglass packing, along one side of a perforated conduit 18 mounted internally of the elongated tubular body 15. The perforated conduit 18 is secured at opposite ends to the inlet end wall 26 and a transverse, imperforate interior wall 22 that is positioned intermediate and parallel to the outer end walls.

Upon entering the device 10, the engine emissions travel through the inlet 11 and are broken into smaller streams which travel outward through perforations 19 in the conduit and pass into contact with the reduction catalyst 12. The structure and function of the reduction catalyst and oxidation catalyst are described, infra. After passing in contact with the reduction catalyst 12, the exhaust gas stream flows into a transfer chamber 24 extending axially between inlet end wall 26 and the outlet end wall 28 along one side of the body 15 opposite the sound attenuation chamber 17. The engine emissions will permeate through the reduction catalyst 12, and oxidation catalyst 14 at a rate which is dependent upon the size of the combustion engine, ambient temperatures and load conditions.

A heating element 30, an adjacent surface of an oxidation catalyst 14, and an inside wall surface of the exhaust transfer chamber 24 define the heating chamber 32 for oxidation of remaining untreated components in the emission flow. An outer wall of the exhaust transfer chamber 24 is provided with a plurality of air orifices 34 to allow outside or ambient air, moving along an annular sleeve 36 around the elongated tubular body 15 to mix with emission stream components in the heating chamber 32, which components have been subject to a reducing process by the reduction catalyst 12. The annular sleeve 36 is defined between the outside surface of the elongated tubular body 15 and an outer shroud 38 which encircles the elongated tubular body.

In those situations where the device is mounted horizontally, for example in cars and light-duty trucks, as opposed to vertically, for example in stationary applications (generators, pumps) or large semi-truck applications, the flow of outside ambient air into the heating chamber 32 is facilitated by a flared end 40 at the inlet end of the shroud 38, wherein the flared end is normally pointed toward the front of an automobile to take full advantage of ram air flow as the vehicle travels forwardly.

Outside ambient air enters the passage 36 through an annular inlet opening 42 and is warmed while passing around the outside surface of the elongated tubular body 15, which is at an elevated temperature. The outside surface of the elongated tubular body 15 is raised to a relatively high temperature due to thermal conduction from the high temperature of exhaust gasses against the wall of the elongated tubular body 15. The shroud 14 is attached to the end outlet wall 28, and at the point of attachment 44 there is defined an air trap 48 that redirects the partially heated air to pass through the air orifices 34, to facilitate oxidation in the exhaust gas heating chamber 32 of the partially treated emissions.

The exhaust gas emissions permeate through the oxidation catalyst 14 at a predetermined rate, which is suitable to oxidize any remaining HCs and CO present in the stream of exhaust products. The clean and treated emission stream then exits the device 10 via an attached tailpipe 50 at the end outlet wall 28.

In order to facilitate easy maintenance of the device 10, the shroud 38 and the generally tubular member 15 each can be formed of two parts joined together with a series of connecting bolts 52. The drawing illustrates front and rear segments of the shroud 38 and the generally tubular member 15 being connected near the heating element 30. This configuration allows for easier servicing of the heating element 30 and the catalysts 12, 14. Of course, other multi-unit configurations for the shroud 38 and the generally tubular member 15 also can be employed. To facilitate easier removal of unoxidized carbon, debris, and general particulate matter, the interior surfaces of the annular chamber 24 and the exhaust outlet chamber 45 can be curved, as designated by the dashed lines. These curved surfaces minimize build up of debris.

The upstream end 12a of the reduction catalyst 12, and the downstream end 14b of the oxidation catalyst are secured in position by a series of form fitting flanges or lips 23 integrally attached to the inner surface of the inlet wall 26 and inner surface of the outlet wall 28, respectively. The downstream end 12b of the reduction catalyst 12 and the upstream end of the oxidation catalyst 14a are likewise secured by form fitting flanges 25 or lips integrally connected to the imperforate interior wall 22.

Figure 3:
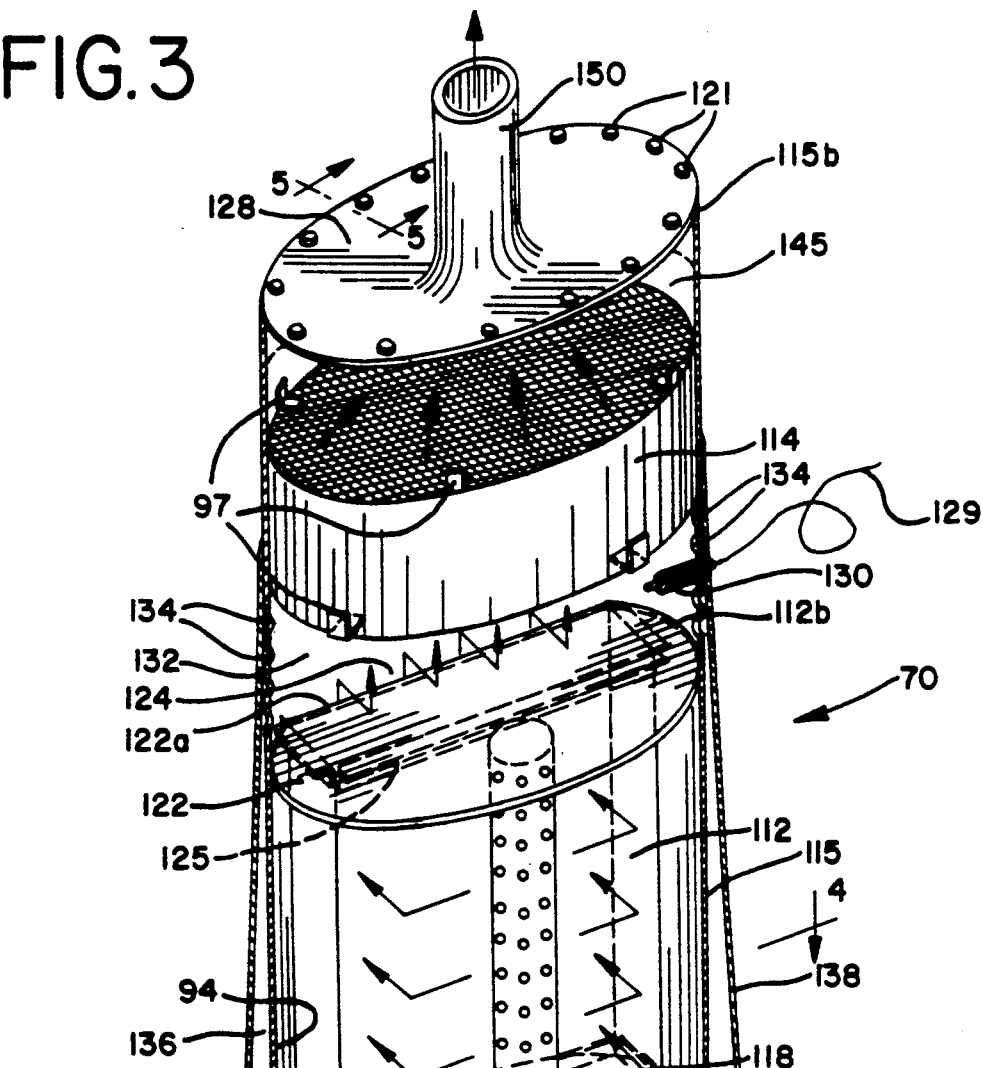
FIG. 3 is a cross-sectional view of another embodiment of the present invention.

A similar embodiment of the invention is depicted in FIG. 3 and is generally designated as 70. This device 70 and its elements are similar in construction and function to the device 10 and elements depicted in FIGS. 1 and 2, with the elements depicted in FIG. 3 being numbered exactly the same as the corresponding elements depicted in FIG. 1 but for the prefix 1.

There are a number of differences between device 10 and 70. For example, the oxidation catalyst 114 is generally elliptical to coincide with the more flattened elongated tubular body 115. Furthermore, the rectangular reduction catalyst 112 is secured by a first surface 88 of the end inlet wall 126 which is adapted to snugly fit over an upstream end 112a of the reduction catalyst. The upstream end 112a of the reduction catalyst 112 is held secure to the first surface 88 of the end inlet wall 126 by a flange 123 attached to the inlet end wall. The flange 23 surrounds the entire periphery of the upstream end 112a of the reduction catalyst to hold the catalyst in place as shown in FIG. 3.

Figure 4:
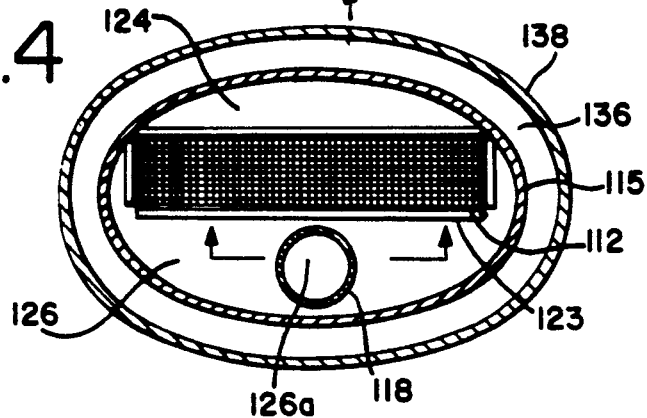
FIG. 4 is a cross-sectional view of the invention taken along line 4—4 of FIG. 3.

A second surface 90 of the end inlet wall 126 faces outwardly from the device 70. As shown in FIG. 4, the end inlet wall 126 contains an aperture 126a to accommodate the inlet tube 111.

A downstream end 112b of the reduction catalyst 112 is secured to a generally eliptically-shaped, transverse inner wall 122 terminated on one side by an edge 122a to define a flow passage 124 for gases leaving the reduction catalyst 112. The curved portion of the transverse inner wall 122 forms an air tight seal with part of the inner surface 94 of the elongated tubular body 115, and is permanently attached to the inner surface 94, via rivets, welds, or any other conventional mode of sheet metal attachment. The downstream end 112b of the reduction catalyst 112 is snuggly fitted to the transverse inner wall 122 by a second flange 125 attached to the wall wherein the second flange 125 is adapted to the shape defined by the downstream end 112b of the reduction catalyst.

The oxidation catalyst 114 is secured to the inside wall 94 of the generally tubular body 115 by a series of tabs 97 which in turn are attached to the inside wall of the generally tubular body by welds, machine screws or any other heat-resistant attachment means.

Figure 5:
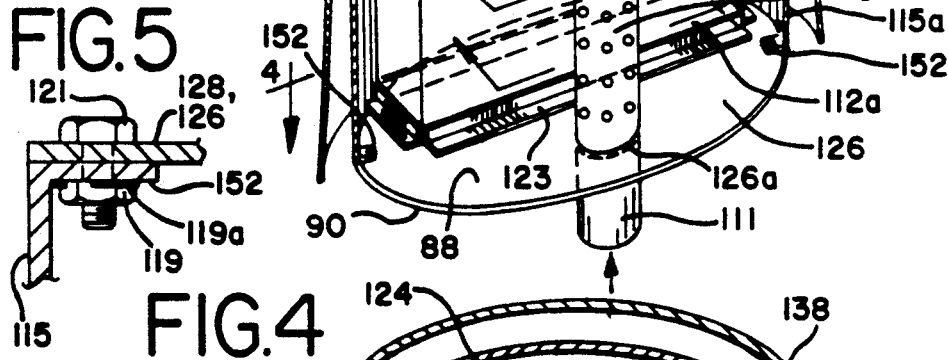
FIG. 5 is a cross-sectional view of the invention taken along line 5—5 of FIG. 3.

To aid in the maintenance and repair of the internal components of the device 70, bolts 121 are used to removably attach the end inlet wall 126 and the end outlet wall 128 to the upstream end 115a and downstream end 115b of the elongated tubular body 115. To aid in this attachment, and as shown in FIG. 5, each end of the elongated tubular body 115 has a series of inwardly extending flanges 152 to each of which is attached, via spot-welds 119a, or other suitable means, a nut 119 to mate with the bolt 121. Other attachment means also can be used, including, but not limited to, machine screws, clips, clamps, snap-fit-engagement configurations, and latches.

Figure 6:
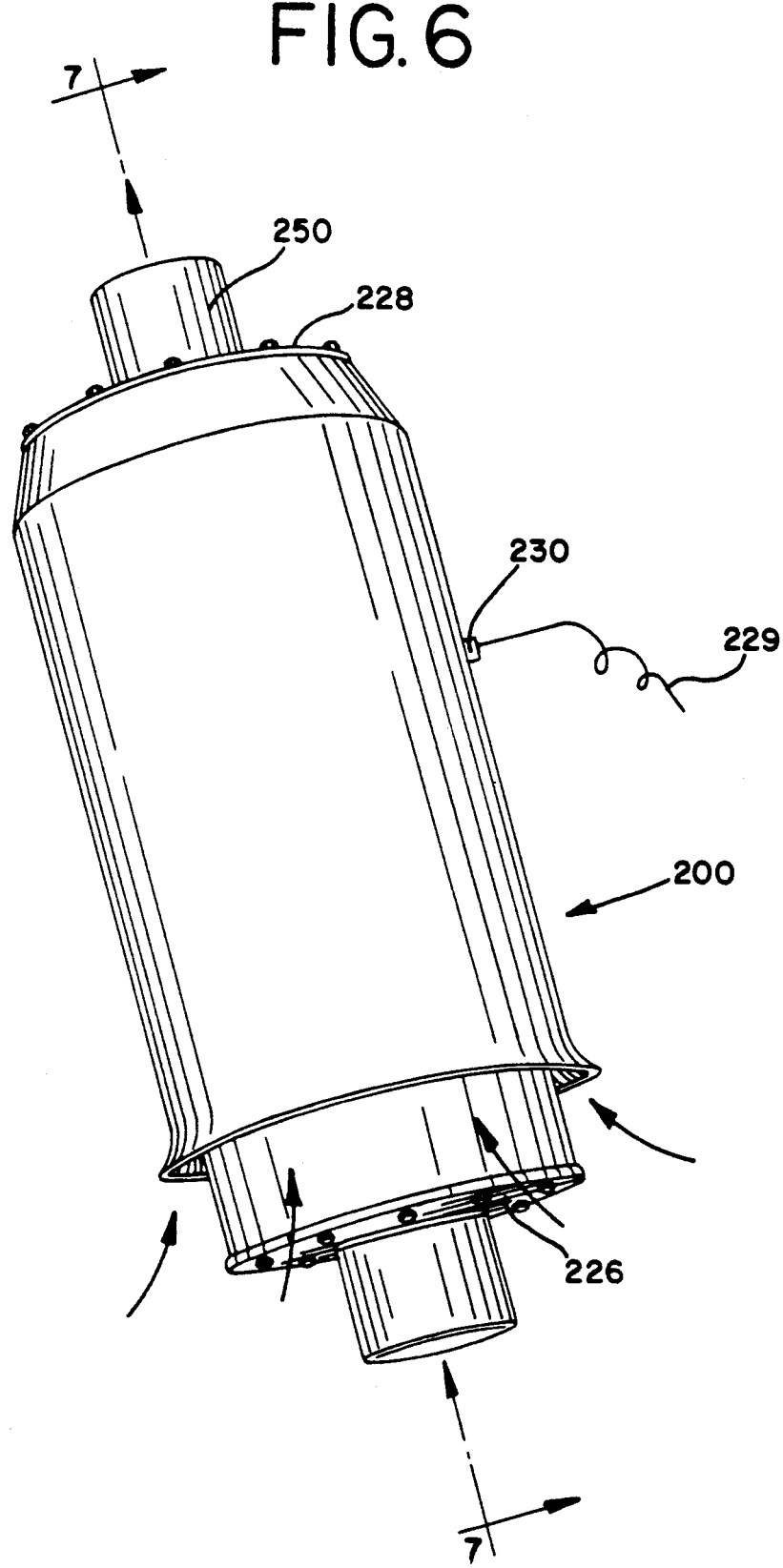
FIG. 6 is a third embodiment of the invention.
Figure 7:
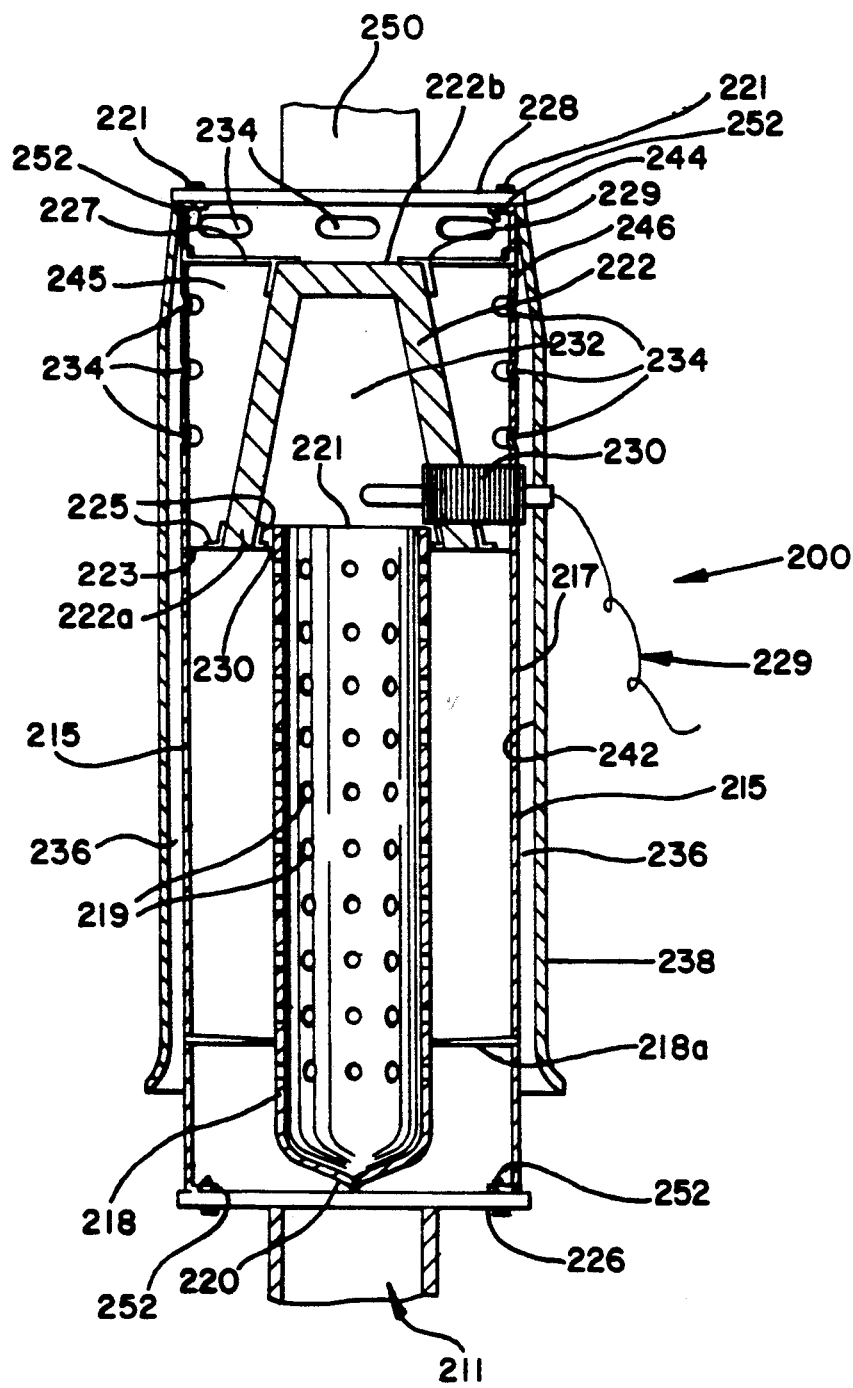
FIG. 7 is a cross-sectional view of a third embodiment of the invention taken along line 7—7 of FIG. 6.

FIGS. 6 and 7 depict a third embodiment of the invention designated as 200 wherein a single, three-way catalyst 222 is utilized. As with FIG. 3, the major elements of this embodiment are similar to those elements found in FIG. 1. Therefore, numerical designation of these elements is identical with those elements depicted in FIG. 1, except that the number 2 is an added prefix to the corresponding numbered elements in FIGS. 6 and 7.

Also similar to the previous embodiments 70, the device depicted in FIGS. 6 and 7 features a removably attached inlet wall 226 and outlet wall 228 for easy maitenance and repair. Furthermore, the upstream end 222a of the three-way catalyst 222 of this third embodiment is removably secured in position by a series of flanges 225 attached to the annular wall 223. A series of struts 227 with flanges 229 or lips integrally formed therefrom to snuggly fit the periphery of the downstream end 222b of the catalyst 222 provides additional stabilization. These downstream struts 227 are removably attached to the inner surface of the generally tubular member 215 with machine screws, or other suitable attachment means, to facilitate easy removal of the catalyst.

A major difference with this device 200 compared to devices 10 and 70 is that the heating element 230 is placed either directly before any catalyst means or within the catalyst means.

A perforated conduit 218 is secured internally of the elongated tubular body 215 by a plurality of radial struts or supports 218a spaced apart longitudinally of the perforated conduit 218 and extending radially from the outside surface of the perforated conduit to the inside surface of the tubular member 215. Additional stabilization of the perforated conduit 218 is facilitated with its attachment to a solid annular wall 223. The solid annular wall is attached to the inside surface of the tubular member 215 by a series of machine screws or welds. (not shown)

The perforated conduit 218 is closed at the upstream end 220, with the upstream end aerodynamically shaped, as shown, to minimize turbulence and swirling of incoming exhaust. Alternatively, the upstream end 220 can be a simple cap, effecting a flat surface, or any other suitable shape. The opposite or downstream end 221 of the perforated conduit 218 is open, thereby allowing exhaust emissions, which enter the conduit via the perforations 219, to exit the conduit.

The emission stream is heated by the heating element 230 disposed upstream from the three way catalyst 222. Alternatively, the emission stream can be heated by a heating unit which is embedded either throughout a catalyst or embedded in a portion of a catalyst to facilitate the formation of oxidation zones within the catalyst.

After initial reduction and oxidation catalytic treatment, the now, partially-treated emission stream is mixed with heated ambient air. The heated ambient air flows into an annular chamber 245 around the outside surface of the catalyst 222 via air orifices 234 to facilitate additional oxidation of any remaining HCs and CO in the stream. The ambient air is heated as it passes through an annular flow passage 236, defined by the hot outer surface of the generally tubular member 215 and collects in an air trap 246 defined by the point of attachment 244 of the shroud 238 and the inside surface 242 of the shroud which encircles the generally tubular body 215. The outer surface of the generally tubular member 215 is relatively hot due to thermal conduction of the high temperature of exhaust gases received by the generally tubular member. After the remaining objectionable constituents in the stream have been treated in the annular chamber 245, the clean and treated exhaust stream leaves the device 200 via an outlet conduit 250.

Heating Element

The heating element 30, 130 and 230 can be a high resistance wire heating coil, glow plug, flame, spark or the like. The heating element 30, 130 and 230 is programmed to stop providing heat to the system after the temperature of the catalysts 12, 14, 112, 114, 222, and particularly the oxidation catalysts 14, 114 and portions of 222, reach a reaction- or "lighting off"-temperature range of between approximately 200° C. and 400° C., and preferably at a temperatute of 250° C. Such programming can be effected in a myriad of ways, including, but not limited to a thermocouple-solenoid arrangement, or the application of microprocessors whereby the processor monitors a base-collection junction voltage viz. a comparator to ultimately activate a solenoid.

The heating element is energized electrically via a conducting wire 29, 129, 229, or other suitable means.

Multi-Purpose Shroud

An integral component of the invention comprises an elongated elliptical tubular shroud or sleeve 38, 138, 238 which surrounds the generally tubular member 15, 115, 215 containing the heating chamber so as to direct heated air toward the oxidation chamber 32, 132 and annular chamber 245, which is located at the downstream side of the reduction catalyst components. The shroud 38, 138, 238 supplants the heretofore relied upon air pump for providing extra oxygen for oxidation of HCs and CO.

The shroud 38, 138, 238 and the outer wall of the tubular member 15, 115, 215 define an annular flow passage 36, 136, 236 for warming ambient, outside air before mixing with the emission stream in the oxidation reaction chamber 32, 132, and the annular chamber 245. Any suitable, corrosion-resistant and heat-resistant material can be used for the tubular member body 15, 115, 215 and heat-retaining shroud 38, 138, 238, for example, 0.022 inch thick sheet metal or aluminum.

Three-Way Catalyst

Generally, the catalyst material can be either a ceramic substrate or pellets that are coated with a base of alumina and then impregnated with catalytically active noble metals. Any standard wash coat or combination of high surface area oxides can be used to comprise the base coats of the reduction and oxidation catalysts 12, 14, 112, 114 and the three-way catalyst 222. Generally, about a 70 percent gamma-alumina and 30 percent cerium oxide mixture is favorable, with trace amounts of Group VIII metal oxides, including but not limited to the nickel-, copper- and iron-oxides.

Oxidation catalysts 14, and 145 contain platinum and/or palladium for effective oxidation while the reduction catalysts 12 and 112 must also contain rhodium. For the three-way catalyst 222, a greater percentage of rhodium is located toward the front (upstream side) of the catalyst to reduce the $NO_x$ with greater percentages of palladium and platinum found in the downstream side of the catalyst 222 for oxidation purposes.

The configurations of devices 10 and 70 also allow for a three-way catalyst to be situated in place of the reductions catalysts 12, and 112, while still maintaining the heating elements 30, 130 and oxidation catalysts further downstream for additional oxidation measures. Therefore, requirements for the catalyst mixtures will vary, depending upon the application. Catalyst mixtures are available on a myriad of substrates, including ceramic, from specialty-coating commercial supply houses such as Prototech, Inc., in Needham, Mass., and Englehardt, Inc., in Edison, N.J. The shape of the catalysts can vary, with the rectangular configurations of the reduction catalysts 12, 112 and oxidation catalyst 14 depicted in FIGS. 1 and 3 and the inverted cup configuration for a three-way catalyst 222 in FIG. 5 as exemplary configurations. The ovoid shape of the oxidation catalyst 114 depicted in FIG. 3 is another exemplary configuration of such substrates that can be coated with catalyst mixtures.

Generally, the catalyst shape must provide sufficient surface area to promote efficient and relatively complete reduction and oxidation of constituents. As a major benefit of the invented device is efficient reduction of diesel-emitted $NO_x$, any catalyst should be sufficient to handle typical maximum flow rates of diesel engines of between 1,000 cubic feet per minute (cfm) and 2,000 cfm. This wide range of cfm values makes the invention particularly attractive for both light- and heavy-duty applications. For example, a 301 hp diesel engine by John Deere Company, Inc., Rock Island, Ill., Model No. 6619-a, has a maximum flow rate of 1,854 cfm. The pollutants liberated from such a flow rate include the following values:

| | | |
|---|---|---|
| $NO_x$: | 3,000 | grams/hour |
| CO: | 530 | grams/hour |
| HC: | 95 | grams/hour |
| $SO_2$: | 115 | grams/hour. |

The catalyst size necessary to accommodate the flow-rate from a Model 6619-a is approximately 1500 cubic inches. This catalyst volume would effect a pressure drop of between 2 and 2.5 inches of water, well within practical limits of back pressures for most diesel engines which range from 20 inches of water for turbocharged engines to 55 inches of water for heavy duty applications. This pressure drop is consistent with preferred pore sizes in automobile catalysts of between 200 and 600 cells/in.$^2$, and most preferably of 400 cells/in.$^2$. Ceramic substrates having these preferred cell densities are commercially available in a variety of sizes and forms, for example those ceramic monolithic catalytic converter substrates comprising the Celcor® substrates, by Corning Inc., Corning, N.Y.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A method for treating engine exhaust emissions and dampening engine noise comprising the steps of:
   (a) first, directing said engine exhaust emissions through a perforated conduit;
   (b) second, passing said engine exhaust emissions in contact with a reducing catalyst in an oxygen-deficient reaction chamber;
   (c) third, heating said engine exhaust emissions to a predetermined temperature after passing said engine exhaust emissions in contact with said reducing catalyst;
   (d) fourth, mixing the reduced engine exhaust emissions with heated ambient air supplied by an air-handling shroud; and
   (e) fifth, subsequently passing the engine exhaust emissions in contact with an oxidizing catalyst.

2. The method as recited in claim 1 wherein said predetermined temperature is provided in a range of between about 200° C. and 400° C.

3. The method as recited in claim 1, wherein engine exhaust emissions are maintained at a predetermined temperature by a heating means.

4. The method as recited in claim 3, wherein the heating means is a high resistance wire heating coil, a glow plug, a flame, a spark, or a spark plug.

5. The method as recited in claim 3, wherein the heating means ceases to function after the oxidizing catalyst reaches a predetermined temperature of approximately 250° C.

6. The method as recited in claim 1 wherein the reducing catalyst and oxidizing catalyst are part of a three-way catalyst.

7. The method as recited in claim 1 wherein the reducing catalyst and oxidizing catalyst are comprised of:
   gamma-alumina;
   cerium oxide;
   metal oxide; and
   noble metal.

8. The method as recited in claim 7 wherein the metal oxide is selected from the group consisting of nickel oxides, iron oxides, copper oxides and combinations thereof.

9. The method as recited in claim 7 wherein the noble metal is selected from the group consisting of platinum, palladium, rhodium and combinations thereof.

10. A device for treating an engine exhaust emissions stream and dampening engine noise comprising:
    (a) a means for breaking up the exhaust emissions stream into smaller streams;
    (b) means for reducing the engine exhaust emissions streams in an oxygen-deficient reaction chamber;

(c) means for heating the engine exhaust emissions downstream from the reducing means;

(d) means for directing heated air to the now heated engine exhaust emissions; and (e) means for oxidizing said exhaust emissions.

11. The device as recited in claim 10 wherein the heating means is a glow plug, a flame, a spark, a spark plug, or an electrical resistance wire.

12. The device as recited in claim 10 wherein the oxidizing catalyst means is downstream from the heating means.

13. The method as recited in claim 10 wherein the reducing means and the oxidizing means comprise:
   gamma-alumina;
   cerium oxide;
   metal oxide; and
   noble metal.

14. The device as recited in claim 13 wherein the metal oxide is selected from the group consisting of nickel oxide, iron oxide, copper oxide and combinations thereof.

15. The device as recited in claim 13 wherein the noble metal is selected from the group consisting of platinum, palladium, rhodium and combinations thereof.

16. The device as recited in claim 10 wherein the oxidizing means is exposed to heated ambient air.

17. The device as recited in claim 10, wherein the means for directing heated air to the now heated engine exhaust emissions downstream from the reducing means is a shroud which forms an annular air inlet into the device.

* * * * *